US012731093B2

(12) United States Patent
Eldar

(10) Patent No.: US 12,731,093 B2
(45) Date of Patent: Sep. 8, 2026

(54) CASE MANAGEMENT TROUBLESHOOTING VIEW

(71) Applicant: Boost SubscriberCo L.L.C., Englewood, CO (US)

(72) Inventor: Eran Eldar, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 204 days.

(21) Appl. No.: 18/590,570

(22) Filed: Feb. 28, 2024

(65) Prior Publication Data

US 2025/0272640 A1 Aug. 28, 2025

(51) Int. Cl.
*G06Q 10/0633* (2023.01)
*G06Q 10/0639* (2023.01)

(52) U.S. Cl.
CPC ..... *G06Q 10/0633* (2013.01); *G06Q 10/0639* (2013.01); *G06Q 10/06393* (2013.01)

(58) Field of Classification Search
CPC ........... G06Q 10/0633; G06Q 10/0639; G06Q 10/06393
See application file for complete search history.

(56) References Cited

U.S. PATENT DOCUMENTS

2012/0030067 A1* 2/2012 Pothukuchi .......... G06Q 10/087 705/28
2015/0378529 A1* 12/2015 Ramanathan ........... H04L 67/10 715/834
2017/0364843 A1* 12/2017 Haligowski ........ G06Q 10/0633

OTHER PUBLICATIONS

Ilic, et al., Increasing Supply-Chain Visibility with Rule-Based RFID Data Analysis, 13 IEEE Internet Computing, 31(2009) (Year: 2009).*

* cited by examiner

*Primary Examiner* — Charles Guiliano
(74) *Attorney, Agent, or Firm* — Jeremiah J. Baunach; Frontier IP Law PLLC

(57) ABSTRACT

A disclosed method may include (i) tracking, by a mobile virtual network operator, for each respective case in a plurality of cases, progress through a series a nodes for respective performance stages along a production cycle, (ii) tracking, by the mobile virtual network operator, for each respective case in the plurality of cases, whether each respective case experienced a fallout at each node in the series of nodes such that a fallout rate is established for each respective node in the series of nodes, (iii) categorizing, by the mobile virtual network operator, the fallout rate at each respective node into a respective performance category for the respective node, and (iv) providing, by the mobile virtual network operator, a graphical user interface that displays the series of nodes as a series of graphical nodes and that graphically indicates each respective performance category for each respective node.

18 Claims, 10 Drawing Sheets

CASE MANAGEMENT TROUBLESHOOTING VIEW

BRIEF SUMMARY

This disclosure is generally directed to systems, methods, and computer-readable media relating to a case management troubleshooting view. Generally speaking, some order management systems may enable a user or organization to see a simple, quick, or streamlined view into single orders (see, e.g., FIG. 2). The streamlined view may show a series of nodes that correspond to respective performance stages within a production cycle or production line for a product or service. Within the streamlined view, a user may quickly or readily ascertain where the particular order has successfully progressed. Accordingly, the streamlined view may identify the particular performance stage and corresponding node to which the order has progressed at the current time of viewing or checking.

Although the streamlined view outlined above provides a certain benefit to the user, it nevertheless suffers from one or more drawbacks, inefficiencies, and/or suboptimizations, as discussed in more detail below. For example, the streamlined view might not necessarily distinguish between scenarios where the order has progressed to a certain stage and remains at that certain stage because the order has experienced a failure there or, instead, simply because the order has not completed ordinary and successful processing at that stage. In other words, even if the order is progressing normally the order may remain seemingly stuck at a particular performance stage simply due to the limited amount of time spent at that particular performance stage rather than due to experiencing any sort of failure at the performance stage. The streamlined view may fail to provide such an indication by way of text or any other graphical indicator. Additionally, with respect to performance stages or nodes that the order has proceeded through, the streamlined view might not necessarily indicate whether the progression through these previous stages was successful and uneventful or, instead, the order proceeded through a stage despite experiencing any kind of partial or total failure at that stage.

Additionally, the streamlined view outlined above is limited to intelligence regarding single orders. Accordingly, the benefits of the streamlined view, which involve providing a single graphical user interface that quickly shows graphical indicators or nodes for each performance stage along the production cycle, may not be similarly captured or appreciated in a context where multiple orders, rather than single orders, are involved. In other words, the streamlined view outlined above can be limited to providing a quick and efficient notification regarding the status of a particular single order without providing any such intelligence regarding an overall set, batch, or aggregation of orders, and their corresponding statistics or analytics. These batched orders could be interrelated and/or could occur over the same span of time, for example. Accordingly, this disclosure outlines one or more expansions, improvements, and/or enhancements to the streamlined view that leverages the convenience and associated benefits of the streamlined view, but which inventively applies and transforms them in various ways, especially in the context of multiple or aggregated orders. These inventive improvements are not necessarily limited to the new context of aggregated orders and this disclosure also describes improvements in the context of single order displays, as discussed in more detail below. More generally, this disclosure describes in detail various technologies and embodiments providing additional other insights and improvements in the context of order management and/or graphical user interfaces, especially in the context of mobile network operators and/or mobile virtual network operators, as discussed in more detail below.

In some examples, a method includes (i) tracking, by a mobile virtual network operator, for each respective case in a plurality of cases, progress through a series a nodes for respective performance stages along a production cycle for a product or service of the mobile virtual network operator, wherein each case involves a separate instance of the mobile virtual network operator providing the product or service to at least one client and each performance stage contributes to producing the product or service for the at least one client, (ii) tracking, by the mobile virtual network operator, for each respective case in the plurality of cases, whether each respective case experienced a fallout at each node in the series of nodes such that a fallout rate is established for each respective node in the series of nodes, (iii) categorizing, by the mobile virtual network operator, the fallout rate at each respective node into a respective performance category for the respective node, and (iv) providing, by the mobile virtual network operator, a graphical user interface that displays the series of nodes as a series of graphical nodes and that graphically indicates each respective performance category for each respective node based on the respective fallout rate of the respective node.

In some examples, the method includes tracking, for each respective node in the series of nodes along the production cycle for each respective case in the plurality of cases, whether the respective node experienced success, experienced failure, is currently executing, or is waiting to execute.

In some examples, the graphical user interface further provides a single order display that displays the series of graphical nodes and graphically indicates, for a specific case, whether the respective node experienced success, experienced failure, is currently executing, or is waiting to execute.

In some examples, the single order display graphically displays a data structure containing a plurality of fields describing the specific case.

In some examples, the plurality of fields designates at least a case identifier, a billing account identifier, a shipping account identifier, and a channel through which the specific case was received.

In some examples, the single order display graphically displays a selectable option for a user to perform at least one corrective action in response to a node in the series of nodes having experienced failure.

In some examples, the graphical user interface displays the series of nodes as a series of graphical nodes at least in part by displaying a specific graphical node as an interactive element enabling a user to select and expand the specific graphical node into a subset of multiple graphical nodes corresponding to performance substages of the respective performance stage for the specific graphical node.

In some examples, the graphical user interface displays the specific graphical node with a graphical indication of the specific graphical node as the interactive element enabling the user to select and expand the specific graphical node into the subset of multiple graphical nodes corresponding to performance substages of the respective performance stage for the specific graphical node.

In some examples, the graphical user interface displays the specific graphical node in a form of overlapping rings indicating the specific graphical node as the interactive element enabling the user to select and expand the specific graphical node into the subset of multiple graphical nodes corresponding to performance substages of the respective performance stage for the specific graphical node.

In some examples, the series of nodes features a parallel track comprising a first track and a second track that can be performed at least partially overlapping in time.

In some examples, providing, by the mobile virtual network operator, the graphical user interface that displays the series of nodes as the series of graphical nodes and that graphically indicates each respective performance category for each respective node based on the respective fallout rate of the respective node comprises graphically indicating the respective performance category by drawing each graphical node in the series of graphical nodes with a modification that corresponds to the respective performance category.

In some examples, providing, by the mobile virtual network operator, the graphical user interface that displays the series of nodes as the series of graphical nodes and that graphically indicates each respective performance category for each respective node based on the respective fallout rate of the respective node comprises graphically indicating the respective performance category by drawing each graphical node in the series of graphical nodes in a color that corresponds to the respective performance category.

In some examples, providing, by the mobile virtual network operator, the graphical user interface that displays the series of nodes as the series of graphical nodes and that graphically indicates each respective performance category for each respective node based on the respective fallout rate of the respective node comprises graphically indicating the respective performance category by drawing each graphical node in the series of graphical nodes to include an icon or animation that corresponds to the respective performance category.

In some examples, providing, by the mobile virtual network operator, the graphical user interface that displays the series of nodes as the series of graphical nodes and that graphically indicates each respective performance category for each respective node based on the respective fallout rate of the respective node comprises displaying, within each respective node, an indicator of a direction of change in the fallout rate at the respective node.

In some examples, providing, by the mobile virtual network operator, the graphical user interface that displays the series of nodes as the series of graphical nodes and that graphically indicates each respective performance category for each respective node based on the respective fallout rate of the respective node comprises displaying, within each respective node, a graphical arrow pointing in the direction of change in the fallout rate at the respective node.

In some examples, providing, by the mobile virtual network operator, the graphical user interface that displays the series of nodes as the series of graphical nodes and that graphically indicates each respective performance category for each respective node based on the respective fallout rate of the respective node comprises displaying, within each respective node, the indicator of the direction of change in the fallout rate in a color that matches a color categorization in which the direction of change is categorized.

In some examples, providing, by the mobile virtual network operator, the graphical user interface that displays the series of nodes as the series of graphical nodes and that graphically indicates each respective performance category for each respective node based on the respective fallout rate of the respective node comprises displaying a legend that indicates the color categorization in which the direction of change is categorized.

In some examples, providing, by the mobile virtual network operator, the graphical user interface that displays the series of nodes as the series of graphical nodes and that graphically indicates each respective performance category for each respective node based on the respective fallout rate of the respective node comprises displaying a green indicator for a positive direction of change, a red indicator for a negative direction of change, or a yellow indicator for a neutral direction of change.

In some examples, a system comprises at least one physical computing processor of a computing device and a non-transitory computer-readable medium that has instructions stored thereon that, when executed by the at least one physical computing processor, cause the computing device to perform operations comprising: (i) tracking, by a mobile virtual network operator, for each respective case in a plurality of cases, progress through a series a nodes for respective performance stages along a production cycle for a product or service of the mobile virtual network operator, wherein each case involves a separate instance of the mobile virtual network operator providing the product or service to at least one client and each performance stage contributes to producing the product or service for the at least one client, (ii) tracking, by the mobile virtual network operator, for each respective case in the plurality of cases, whether each respective case experienced a fallout at each node in the series of nodes such that a fallout rate is established for each respective node in the series of nodes, (iii) categorizing, by the mobile virtual network operator, the fallout rate at each respective node into a respective performance category for the respective node, and (iv) providing, by the mobile virtual network operator, a graphical user interface that displays the series of nodes as a series of graphical nodes and that graphically indicates each respective performance category for each respective node based on the respective fallout rate of the respective node.

In some examples, a non-transitory computer-readable medium has instructions stored thereon that, when executed by at least one physical computing processor, cause a computing device to perform operations comprising: (i) tracking, by a mobile virtual network operator, for each respective case in a plurality of cases, progress through a series a nodes for respective performance stages along a production cycle for a product or service of the mobile virtual network operator, wherein each case involves a separate instance of the mobile virtual network operator providing the product or service to at least one client and each performance stage contributes to producing the product or service for the at least one client, (ii) tracking, by the mobile virtual network operator, for each respective case in the plurality of cases, whether each respective case experienced a fallout at each node in the series of nodes such that a fallout rate is established for each respective node in the series of nodes, (iii) categorizing, by the mobile virtual network operator, the fallout rate at each respective node into a respective performance category for the respective node, and (iv) providing, by the mobile virtual network operator, a graphical user interface that displays the series of nodes as a series of graphical nodes and that graphically indicates each respective performance category for each respective node based on the respective fallout rate of the respective node.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
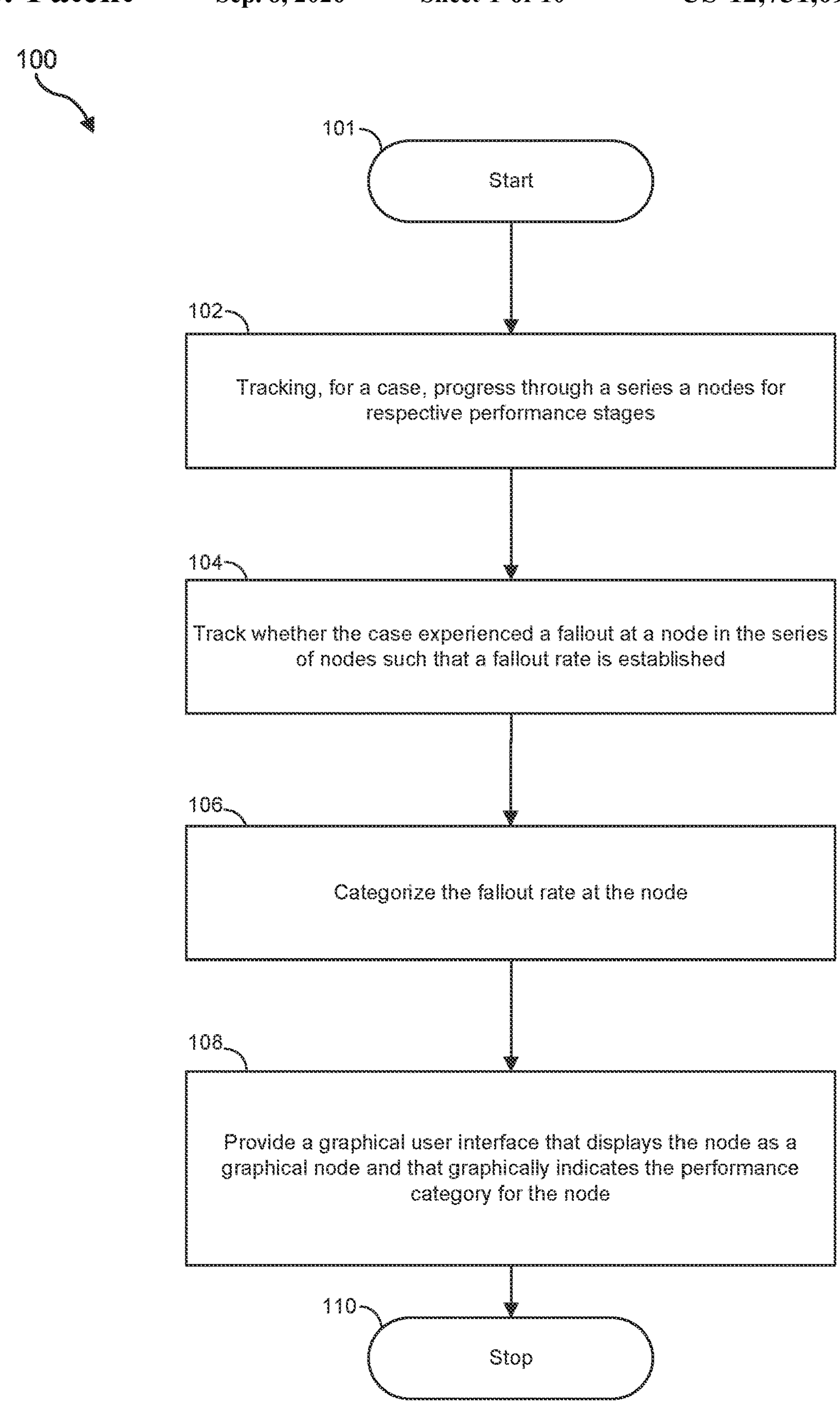
FIG. 1 shows a flow diagram for a method relating to a case management troubleshooting view.

FIG. 1 shows a flow diagram for an example method 100 relating to a case management troubleshooting view. At step 101, method 100 may start or begin. At step 102, method 100 may include tracking, by a mobile virtual network operator, for each respective case in a plurality of cases, progress through a series a nodes for respective performance stages along a production cycle for a product or service of the mobile virtual network operator, wherein each case involves a separate instance of the mobile virtual network operator providing the product or service to at least one client and each performance stage contributes to producing the product or service for the at least one client. At step 104, method 100 may include tracking, by the mobile virtual network operator, for each respective case in the plurality of cases, whether each respective case experienced a fallout at each node in the series of nodes such that a fallout rate is established for each respective node in the series of nodes. At step 106, method 100 may include categorizing, by the mobile virtual network operator, the fallout rate at each respective node into a respective performance category for the respective node. At step 108, method 100 may include providing, by the mobile virtual network operator, a graphical user interface that displays the series of nodes as a series of graphical nodes and that graphically indicates each respective performance category for each respective node based on the respective fallout rate of the respective node. At step 110, method 100 may stop or conclude.

As used herein, the term "case" can generally refer to an order for a product, good, or service. As used herein, the term "performance stage" can generally refer to a different portion or stage along the production cycle or production line for the production of the product, good, or service. Illustrative examples of production stages may include "preprocessor," "project," "payment capture," "customer billing," "provisioning and activation," and "fulfillment," as shown within diagram 200 of FIG. 2. These may be described as "performance stages" in the sense that each stage must be performed as part of producing the corresponding product or service. Nevertheless, these performance stages merely constitute examples for the purposes of illustration, and in other examples different economic sectors, technologies, product lines or services, and/or corresponding performance stages may be included as appropriate and as understood by those having skill in the art.

As used herein, the term "production cycle" can generally refer to an iteration or instance of producing a product, good, or service. As used herein, the term "fallout rate" can generally refer to a rate indicating a number or proportion of orders or cases that experienced a failure at a specific node for a performance stage. The term "fallout rate" helps to indicate that, when a particular case experiences such a failure at a specific node along the production cycle, the order effectively falls out from the overall production cycle rather than proceeding to the finish line of completion and customer satisfaction. As used herein, the term "series of nodes" can generally refer to performance stages such that one performance stage tends to proceed to another performance stage or such that one performance stage relies on or depends on the performance of a prior performance stage in a series relationship, which can be graphically depicted, as discussed in more detail below. As used herein, the phrase "categorizing" can generally refer to assigning a qualitative category such as "success" or "failure" (or variations or degrees of these) based on an analysis or evaluation of the fallout rate, which can be performed by comparing the fallout rate with one or more thresholds, as discussed in more detail below. As used herein, the phrase "graphically indicates each respective performance category for each respective node" can generally refer to displaying each respective node in a differential manner that displays nodes having different categories in different manners, such as by displaying nodes having one category in one color and displaying nodes having a second and distinct category in a second and distinct color, as discussed in more detail below.

Figure 2:
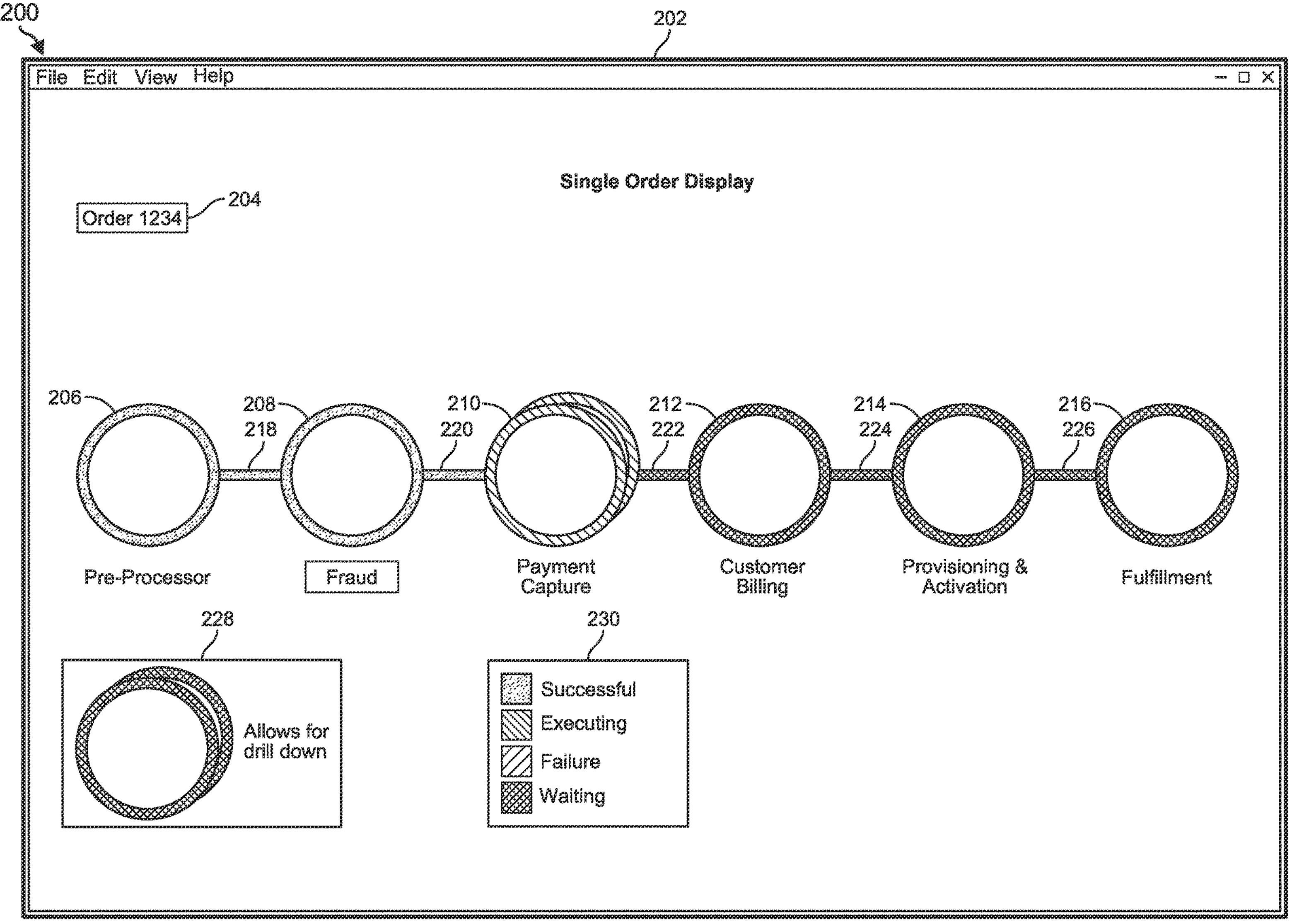
FIG. 2 shows a diagram of a graphical user interface for the case management troubleshooting view in the context of a single order display.

FIG. 2 shows a diagram 200 for a graphical user interface 202 corresponding to a single order display, as shown. Diagram 200 helps to illustrate how, in some examples, method 100 may include tracking, for each respective node in the series of nodes along the production cycle for each respective case in the plurality of cases, whether the respective node experienced success, experienced failure, is currently executing, or is waiting to execute. In addition to tracking such metrics, the graphical user interface can also graphically indicate or graphically display, for a specific case, whether the respective node experienced success, experienced failure, is currently executing, or is waiting to execute.

As shown in diagram 200, the graphical user interface can include an order indicator 204 that identifies a number or identifier for a corresponding order that forms the basis for the graphical depiction of nodes along the production cycle for the particular order. The graphical user interface also graphically depicts each node along the series of nodes from method 100, which in this example includes a node 206, a node 208, a node 210, a node 212, a node 214, and a node 216. The graphical user interface also further displays a corresponding link 218, a link 220, a link 222, a link 224, and a link 226. In some examples, the graphical user interface may, within the single order display, monitor whether a particular node was successful, is currently executing, experienced a failure, or is waiting to execute, without similarly categorizing the links between the nodes. Additionally, or alternatively, in other examples the graphical user interface can categorize the links in a parallel manner by establishing whether each link between nodes was successful, is executing, has experienced a failure, and/or is waiting to execute. An indicator 228 helps to explain to the reader or viewer that a node having this particular graphical format (e.g., overlapping rings) may enable the user to select or toggle that particular node, thereby drilling down and/or zooming in to the corresponding performance stage, which can be revealed or expanded as a series of underlying substages, as discussed in more detail below in connection with FIG. 3, for example. In the example of diagram 200, node 210 is depicted as having the overlapping format indicating that the user can select or toggle this particular node and perform the corresponding drilling down procedure. A legend 230 helps to indicate a color categorization pattern, or other graphical categorization pattern (e.g., through hatching, shading, etc.) for graphically depicting and informing the user regarding the particular category in which a node and corresponding performance stage has been categorized within the single order display. As the reader can ascertain by applying legend 230, graphical user interface 202 indicates that node 206 was successful, node 208 was successful, and node 210 is currently executing, whereas the remaining nodes, including a node 212, a node 214, and a node 216 are still waiting to execute.

Figure 3:
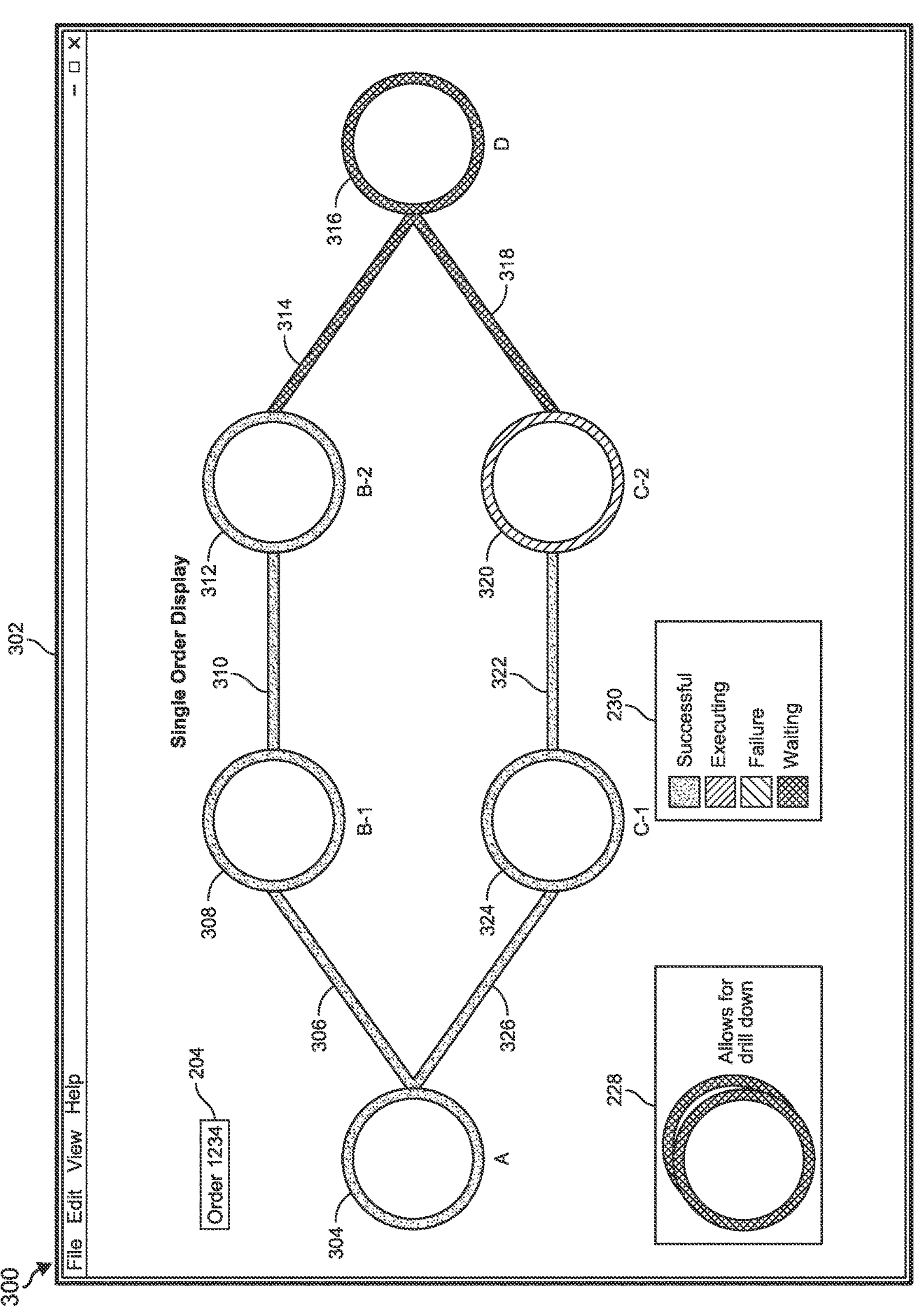
FIG. 3 shows a diagram of the graphical user interface for the case management troubleshooting view in an example featuring a parallel track.

FIG. 3 shows a diagram 300 for a corresponding graphical user interface 302, which can correspond to a version of graphical user interface 202, as discussed in more detail below. Graphical user interface 302 includes a node 304, a node 308, a node 312, a node 316, a node 320, and a node 324, as shown. Graphical user interface 302 also includes a link 306, a link 310, a link 314, a link 318, a link 322, and a link 326. For ease of discussion, these nodes have also been labeled as a node A, a node B-1, a node B-2, a node C-1, a node C-2, and a node D, as shown. Graphical user interface 302 further illustrates how node 308 and node 312 may operate in series with respect to each other, while nevertheless operating in parallel with respect to node 324 and node 320. In other words, diagram 300 helps to illustrate how in some examples the series of nodes features a parallel track comprising a first track and a second track that can be performed at least partially overlapping in time.

In view of the above, graphical user interface 302 provides at least one illustrative example of how the user may select and/or toggle a particular node within graphical user interface 202 and thereby drill down and/or zoom into a more detailed sequence or series of substages that together form a sequence of events or procedures for completing the overall performance stage corresponding to the node that was selected. In other words, diagram 200 and diagram 300 help to illustrate how, with respect to node 210, the graphical user interface displays a specific graphical node (i.e., node 210), as an interactive element enabling a user to select and expand the specific graphical node into a subset of multiple graphical nodes (e.g., shown in diagram 300) corresponding to performance substages of the respective performance stage for the specific graphical node. Moreover, in various examples, not only does the graphical user interface allow one node to be interactive when it looks the same as other nodes, but the graphical user interface can also display the specific graphical node with a graphical indication of the specific graphical node as the interactive element. This is seen, for example, in diagram 200 where node 210 is depicted in the form of overlapping rings. Those having skill in the art will understand, however, that the usage of overlapping rings is merely illustrative and, in other examples, any other suitable graphical modification or indication may be used to indicate to the viewer that the corresponding node is capable of further interaction and drilling down consistent with the discussion above.

Accordingly, in the example of graphical user interface 202 and graphical user interface 302, the user may have optionally selected node 210 (which is shown, within graphical user interface 202, as being a candidate target for the drilling down procedure), thereby resulting in graphical user interface 302 expanding node 210 into the entire series of nodes shown within graphical user interface 302. In this example, node 304 within graphical user interface 302 would correspond to the beginning substage of node 210 and node 316 would correspond to the ending substage of node 210, with each of node 308, node 312, node 324, and node 320 corresponding to intermediary substages to be performed as part of completing the overall performance stage corresponding to node 210, as discussed above.

As shown within diagram 200, node 210 may correspond to "payment capture" as one performance stage within the overall production cycle for a product or service provided by an organization such as a mobile network operator, a mobile virtual network operator, a television provider, and/or a satellite television or satellite service provider. Accordingly, illustrative examples of various substages within the performance date corresponding to node 210 may include payment type capture (e.g., card, PayPal, checking account), address information capture, identity verification, and/or payment confirmation, etc.

In the particular example of graphical user interface 302, legend 230 indicates that node 320 is currently executing. In contrast, graphical user interface 302 also further indicates that node 304, node 308, node 312, and node 324 have all completed successfully. In contrast, node 316 as well as the corresponding link 314 and link 318 are depicted within graphical user interface 302 as currently waiting to execute, due to the fact that node 320 is currently executing. In other words, in this particular example for illustrative purposes, the substage corresponding to node 316 may depend on or rely on the completion of node 308, node 312, node 324, and/or node 320 in order for node 316 to begin processing and/or to successfully complete. Accordingly, because the substage of node 320 is currently processing and has not completed yet, the higher-level parent node in the form of node 210 is also shown as currently processing within graphical user interface 202, as discussed above in connection with FIG. 2.

Figure 4:
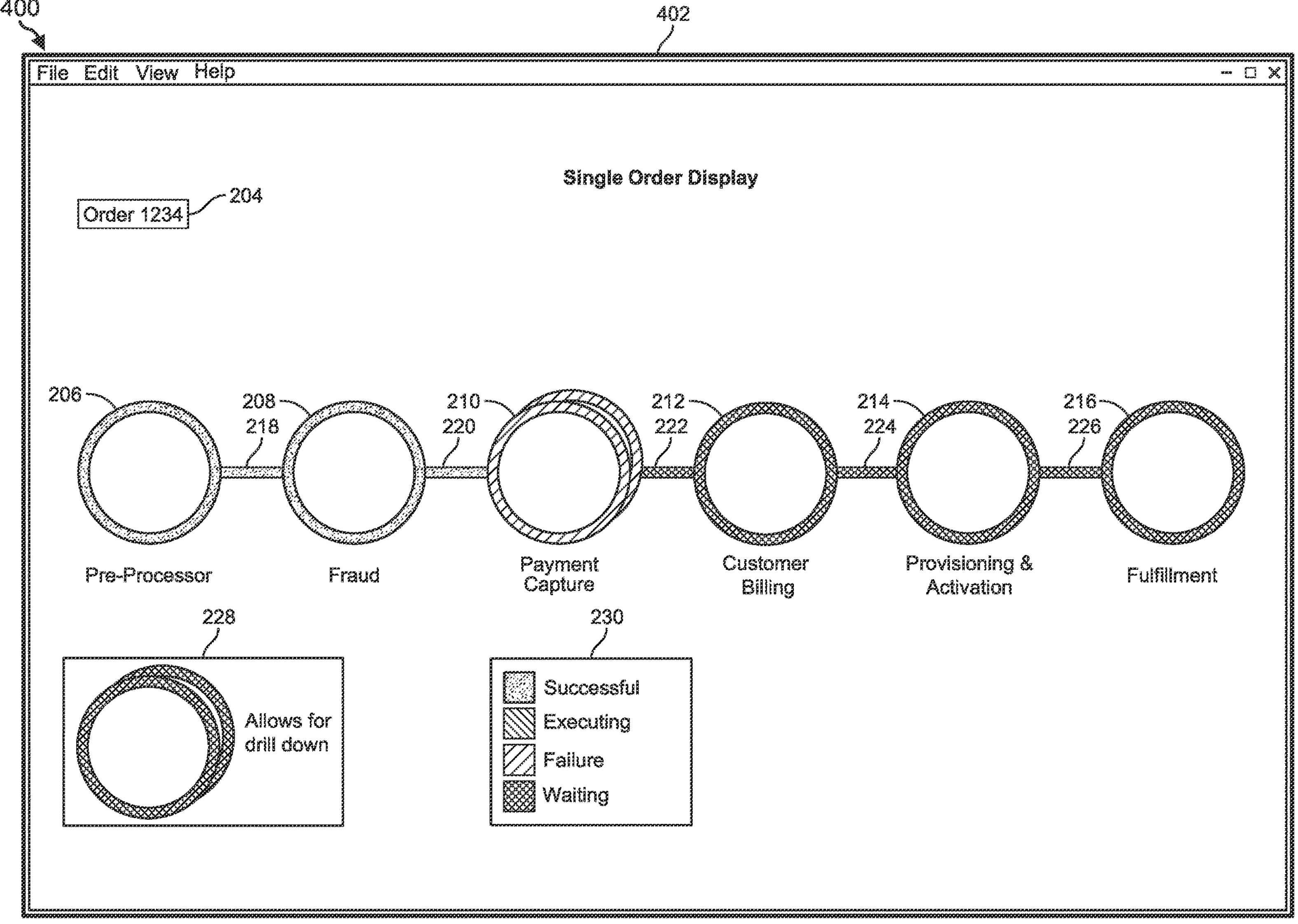
FIG. 4 shows a diagram of the graphical user interface for the case management troubleshooting view in an example featuring a failure.

In contrast to the examples of diagram 200 and diagram 300, FIG. 4 shows a diagram 400 and corresponding graphical user interface 402 in which at least one of the nodes has experienced a failure, as shown according to legend 230. In this particular example, node 210 has switched from a status of currently executing to a status of experiencing a failure. This is graphically depicted within graphical user interface 402 due to the differential coloring applied to node 210 is distinct from the colors applied to the remaining nodes.

Figure 5:
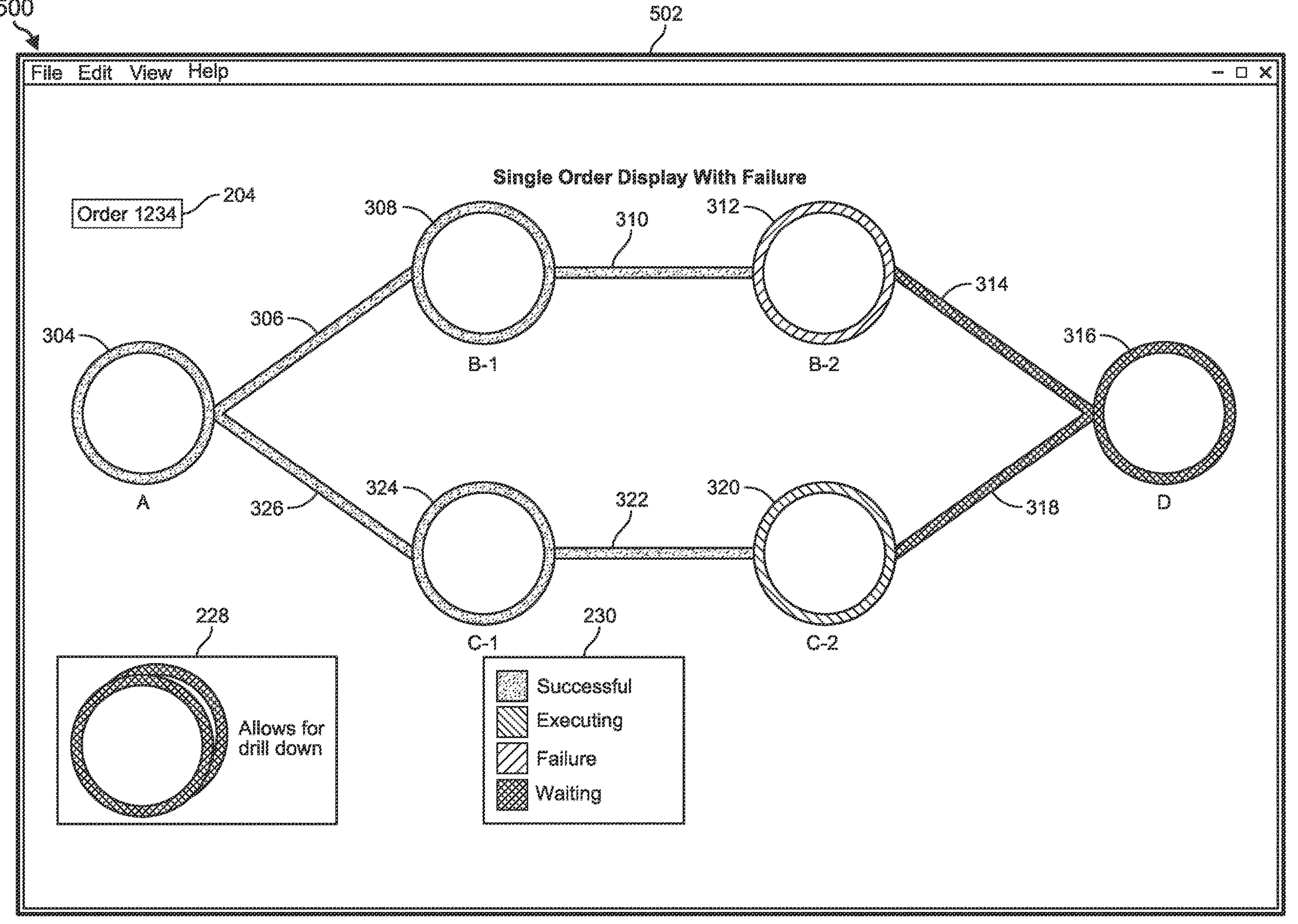
FIG. 5 shows a diagram of the graphical user interface for the case management troubleshooting view in another example featuring a failure.

Similar to the example of diagram 400, FIG. 5 shows a diagram 500 for a corresponding graphical user interface 502 in which at least one of the nodes has experienced a failure. Accordingly, in this example, node 312 has switched from a state of indicating successful completion, as in the example of diagram 200, to a state of having experienced a failure. This is reflected in the different coloring, hatching, and/or shading scheme used for node 312 and consistent with legend 230.

Figure 6:
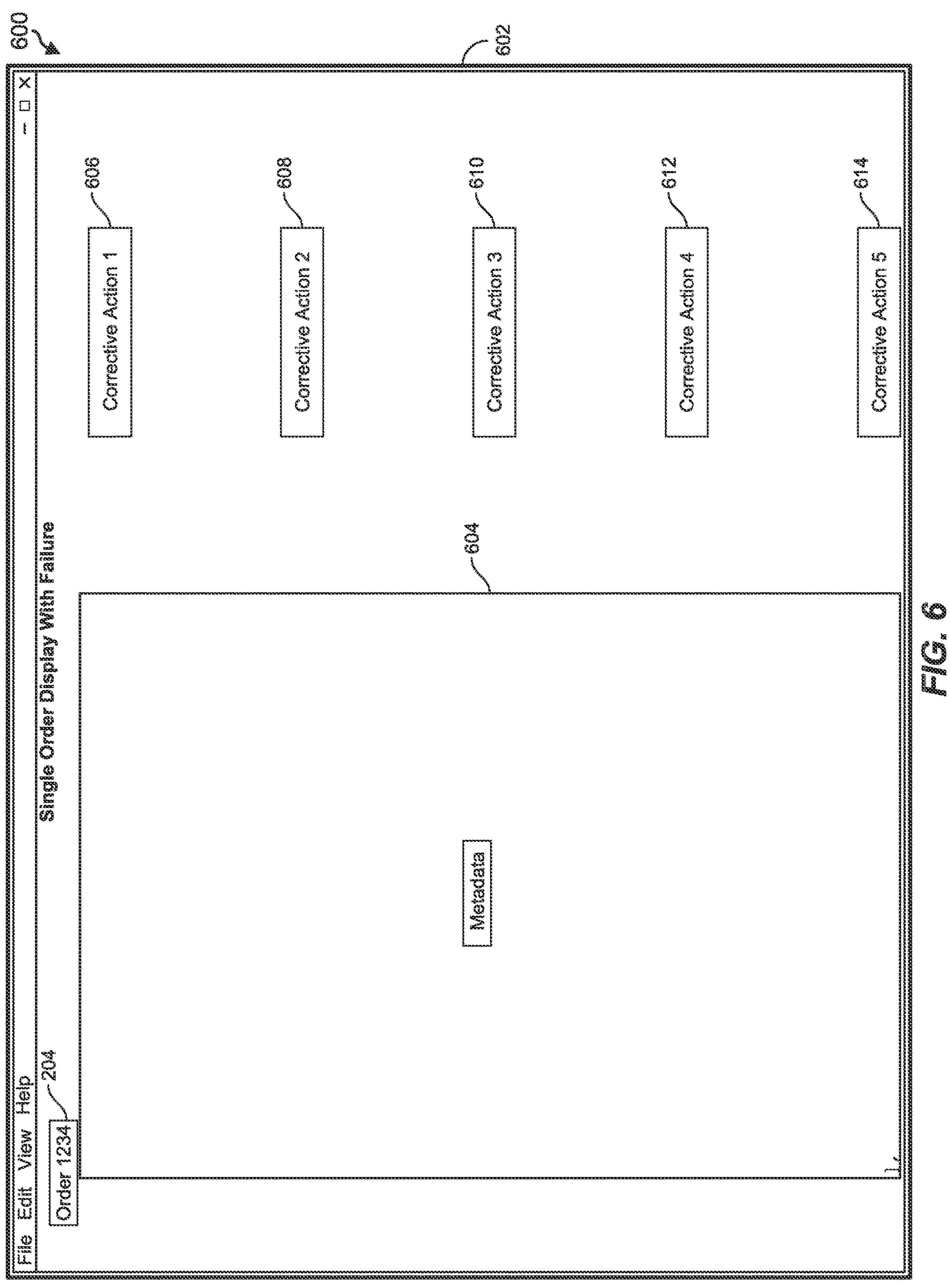
FIG. 6 shows a diagram of the graphical user interface for the case management troubleshooting view in an example providing metadata details and/or corrective action options for addressing one or more instances of a failure experienced along a corresponding production line.

FIG. 6 shows a diagram 600 of a graphical user interface 602 corresponding to a single order display with failure, in which case metadata 604 may have been captured and/or displayed in accordance with the corresponding case or order. Diagram 600 helps illustrate how the graphical user interface can, in the single order display, display a selectable option for a user to perform at least one corrective action in response to a node in the series of nodes having experienced failure. Accordingly, graphical user interface 602 further includes a corrective action button 606, a corrective action button 608, a corrective action button 610, a corrective action button 612, and/or a corrective action button 614, as shown. The use of graphical buttons is provided for ease of discussion with respect to the reader and, in other examples, any suitable input mechanism may be used. Accordingly, any one or more of the various corrective action buttons shown within graphical user interface 602 may enable a user or administrator to perform a corresponding corrective action. Illustrative examples of corrective actions may include restarting or rebooting a device, reformatting a hard disk, repairing a corrupted hard disk or other computing resource, and/or redeploying a computing resource such as a computing node, cluster, pod, etc. Within metadata 604, graphical user interface 602 may display, as part of the single order display, a data structure containing a plurality of fields describing the specific case. The plurality of fields may include at least a case identifier, a billing account identifier, a shipping account identifier, and a channel through which the specific case was received (e.g., an e-commerce channel). Other fields may include an external identifier, an internal order number, an order type, a requested start date, a status, a corresponding marketing brand, an agreement type indicator, one or more items of billing account information, an indication of whether automatic payments are used, and an automatic payment identifier, as well as name and/or address information for the corresponding customer. Similarly, metadata 604 also includes parallel items of information for the shipping account associated with the order as distinct from the billing account.

The various diagrams outlined above generally describe improvements and enhancements in the context of the streamlined view for the single order display. Whereas the streamlined view may provide a simplified black-and-white view that simply marks which node along a series of nodes is the current node where the order is presently located or stuck at, the additions and enhancements discussed above in connection with FIGS. 2-6 provide color coding or other graphically-indicated categorizations of all nodes along the series. The enhancements outlined above also distinguish between an order being located at a particular node simply due to normal processing without sufficient time to complete the processing successfully and an order being located at the particular node due to the node having experienced a failure.

Figure 7:
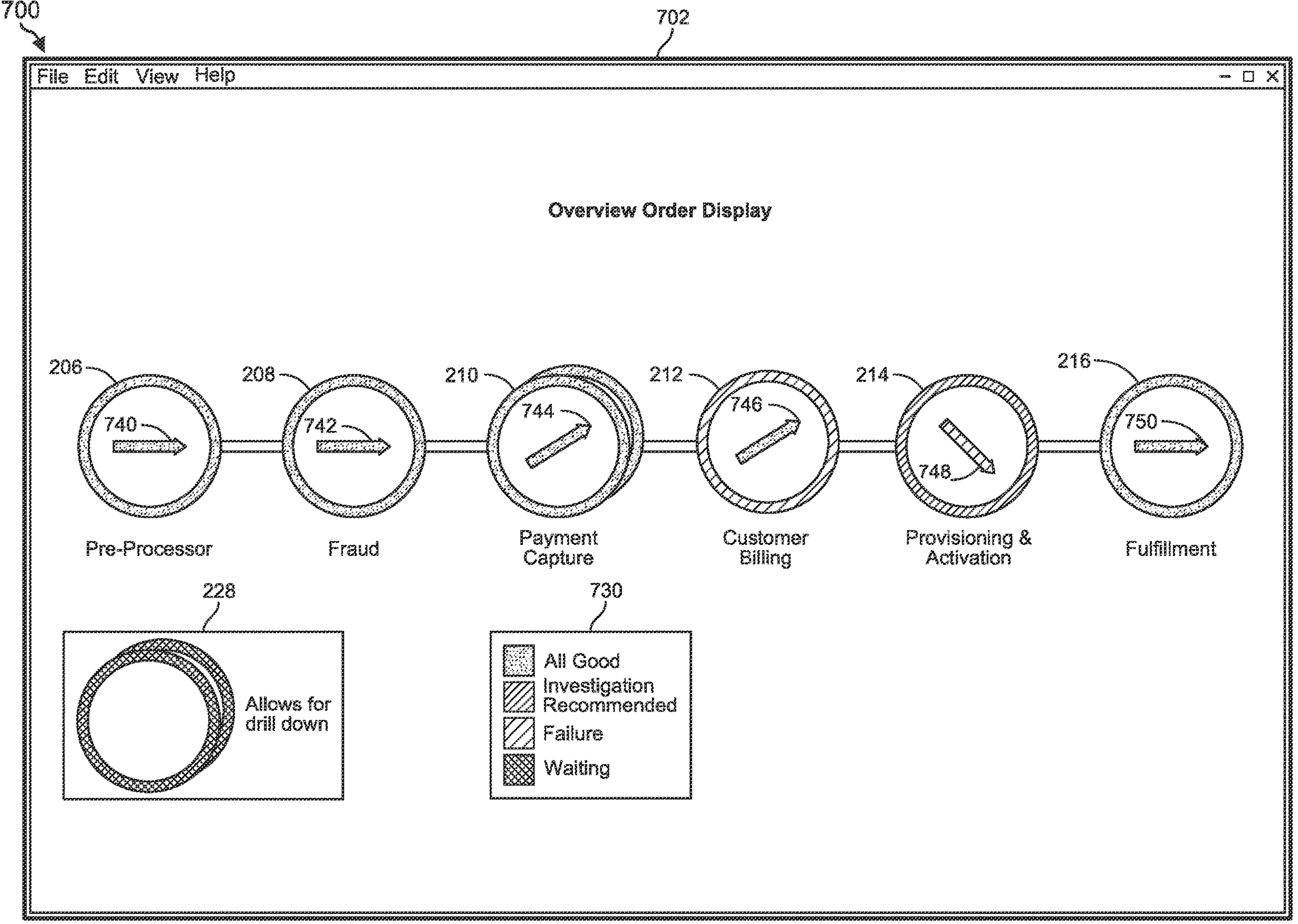
FIG. 7 shows a diagram of the graphical user interface for the case management troubleshooting view in the context of an overview order display for multiple orders.

In addition to the enhancements and improvements discussed above with respect to the single order display, this disclosure also provides an overview order display in the context of multiple orders, such as batched orders or interrelated orders, for example. FIG. 7 shows a diagram 700 including a graphical user interface 702 for an overview order display in the context of multiple orders. Accordingly, diagram 700 may be compared and contrasted with diagram 200, which was directed to the single order display, as discussed at length above. Similar to the single order display of diagram 200, the overview order display of diagram 700 may include each one of node 206, node 208, node 210, node 212, node 214, and node 216. In contrast to diagram 200, however, and diagram 700 the graphical depictions of categorizations for each respective node are based on a consideration or analysis of multiple cases or orders with respect to that particular node rather than just a single case or order, as in the single order display.

To elaborate, diagram 700 illustrates how node 206 for the "pre-processor" performance stage may be categorized as "all good" according to a legend 730. In various examples, legend 730 may have the same, similar, and/or varying categorizations and/or coloring or hatching schemes with respect to legend 230, as discussed above in connection with diagram 200. Additionally, or alternatively, in further examples legend 730 may have a smaller, greater, or equal number of categorizations, which can include different labels or descriptions, such as "ok," "acceptable," "performing well, "best in class," etc. In the example of diagram 700, the categorization for node 206 may indicate that, regardless of whether any one particular order succeeded or failed at the performance stage corresponding to node 206, an overall average, trend, statistic, and/or aggregate analysis indicates that node 206 is performing "all good" or satisfactorily.

For illustrative purposes, the reader can consider an example whereby 10 different cases or orders are processed through the performance stage corresponding to node 206. Furthermore, in this example, the reader can consider a threshold level of success for the "all good" categorization being established as 90% success. Accordingly, in this example, the overview order display may indicate that node 206 is "all good" based on a consideration of which ones or how many of the 10 different cases or orders were successful in comparison to the 90% threshold. In various examples, such threshold values can be used for "less than," "less than or equal to," "greater than," and/or "greater than or equal to" comparisons with essentially the same effect and using essentially the same underlying inventive insight.

In the example of diagram 700, different colors or different types of hatching are used for different nodes to indicate respective categorizations and/or respective fallout rates. Nevertheless, in additional or alternative examples any other suitable graphical or other indication may be used to differentiate or distinguish between the categorizations of the various nodes based on the analysis of the respective fallout rates. In other words, method 100 may more generally include graphically indicating the respective performance category by drawing each graphical node in the series of graphical nodes with a modification that corresponds to the respective performance category. In various examples, such modifications may include a color, an icon, or an animation that corresponds to the respective performance category within the graphical user interface.

Diagram 700 also helpfully includes an arrow 740, an arrow 742, an arrow 744, an arrow 746, an arrow 748, and an arrow 750, which each respectively provide an additional indication for each respective node of the series of nodes along the production cycle. In contrast to the color coding or other graphical indication describing the current status or health of each respective node, each of these arrows describes a trendline over time in terms of the status or health of the respective node. Accordingly, even if a current or static condition of the respective node in the series of nodes along the production line satisfies a threshold of "all good," for example, the trendline over time may nevertheless be decreasing at a precipitous speed such that earlier the node was satisfying the threshold with a very high margin but the node is now currently satisfying the threshold just barely. In this manner, the arrows shown within diagram 700 provide additional information with respect to the color coding or other graphical depiction of the current or static condition of the respective nodes. The use of arrow indicators is merely one example for illustrative purposes and, in various other examples, any suitable graphical indication of increasing, decreasing, or relatively static trendlines may be used accordingly within the corresponding graphical user interface (e.g., a thumbs up or a thumbs down icon, an OK sign or a failure sign, etc.).

The arrows of diagram 700 help to illustrate how method 100 may include displaying, within each respective node, an indicator of a direction of change in the fallout rate at the respective node. Additionally, or alternatively, the arrows may use coloring or hatching that matches a categorization of the direction or rate of change of the fallout rate. In other words, method 100 may include displaying, within each respective node, an indicator of the direction of change in the fallout rate in a color that matches a color categorization in which the direction of change is categorized. In some more specific examples, method 100 may include displaying a green indicator for a positive direction of change, a red indicator for a negative direction of change, or a yellow indicator for a neutral direction of change. A same or similar coloring scheme may be used for coloring or displaying the nodes in the single order display or the overview order display.

Figure 8:
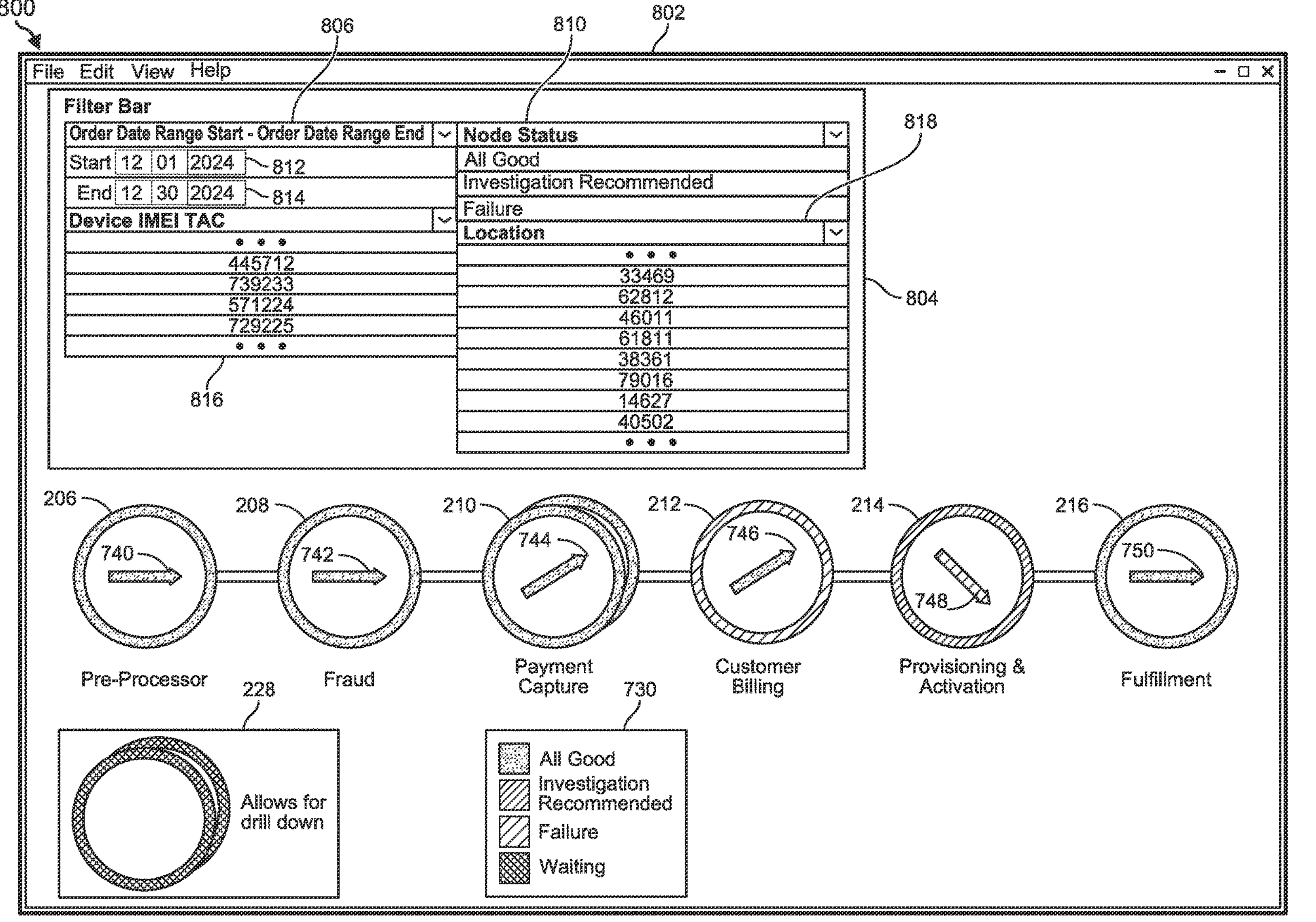
FIG. 8 shows a diagram of the graphical user interface for the case management troubleshooting view while featuring a filter bar for filtering which cases or orders are reflected within the case management troubleshooting view.

FIG. 8 shows a graphical user interface 802 corresponding to the overview order display while further including a filter bar 804 enabling the user or administrator to define parameters defining which particular orders or sets of orders will be used as the basis for generating the graphical depiction of the series of nodes, as shown. Filter bar 804 may include an order range field 806, a device type field 816, a node status field 810, and/or a location field 818, by way of example. Accordingly, when the graphical user interface runs analytics to appropriately categorize and graphically depict the nodes in the series of nodes according to the categorization, the graphical user interface can run those analytics on a set of orders defined by the particular parameters or values specified within filter bar 804. For example, the user or administrator could limit the orders to those orders between a date 812 and a date 814. Additionally, or alternatively, the user or administrator could limit the orders to those orders corresponding to one or more devices selected or identified using device type field 816, as shown. Additionally, or alternatively, the user or administrator could limit the nodes to those nodes having one or more types of identified statuses using node status field 810, which would enable the user to only view or more quickly view the nodes that are currently failing or nodes for which investigation is recommended. Lastly, as another option, the user or administrator could use location field 818 to limit the set of orders to those orders associated with particular locations such as zip codes (e.g., billing zip codes or shipping zip codes). The illustrative fields or limiters described within diagram 800 are merely examples for illustrative purposes. Additionally, or alternatively, in other examples one or more other parameters or fields may be used as part of the process for customizing the overview order display and/or customizing the particular set of orders that form the basis of the analytics resulting in the categorizations of the respective nodes along the production cycle. For example, another field could be the channel through which the order was received such as an e-commerce channel, as discussed above in the context of diagram 600.

Figure 9:
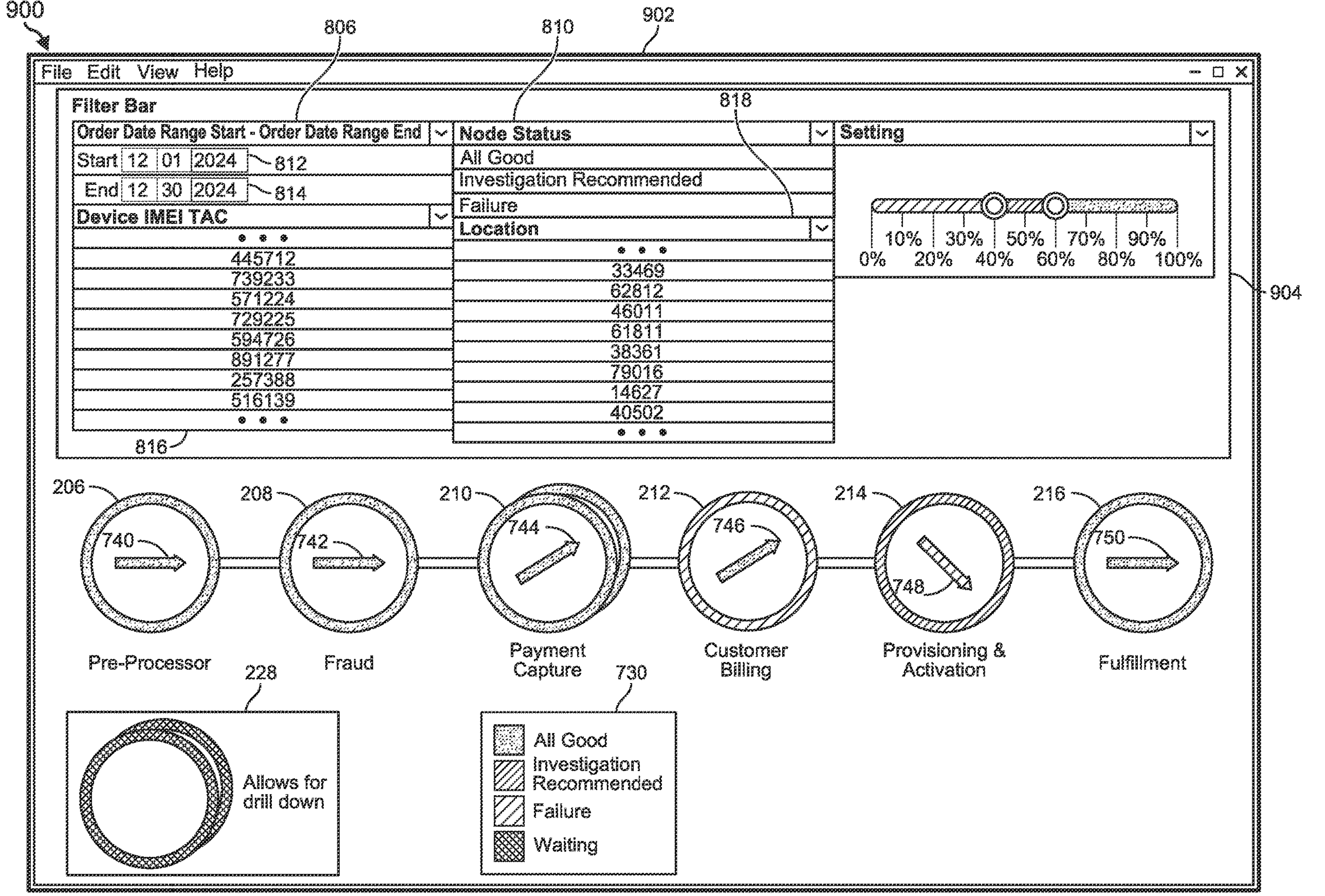
FIG. 9 shows a diagram of the graphical user interface for the case management troubleshooting view while featuring a settings menu that enables the adjustment of one or more thresholds for categorizing performance levels of corresponding nodes along the production line.

FIG. 9 shows a diagram 900 for a graphical user interface 902 that elaborates on the filter bar of diagram 800 by including a settings bar 904. Settings bar 904 may establish one or more thresholds to distinguish between different categorizations of nodes and/or links. In the example of settings bar 904, two different threshold indicators are used to identify corresponding thresholds at 40% and at 60%, thereby creating three separate categories for respective nodes on the production cycle. The example of the settings bar in diagram 900 can be used to establish categories for respective nodes along the series of nodes in the single order display (see FIG. 2), to establish categories for links between nodes in the single order display (see FIG. 2), to establish categories for respective nodes along the series of nodes in the overview order display (see. FIG. 7) to establish categories for respective links along the series of nodes in the overview order display (see FIG. 7), and/or to establish categories for respective arrows along the series of nodes in the overview order display (see FIG. 7). In various examples, these thresholds may be established in terms of absolute numbers and/or percentages.

Figure 10:
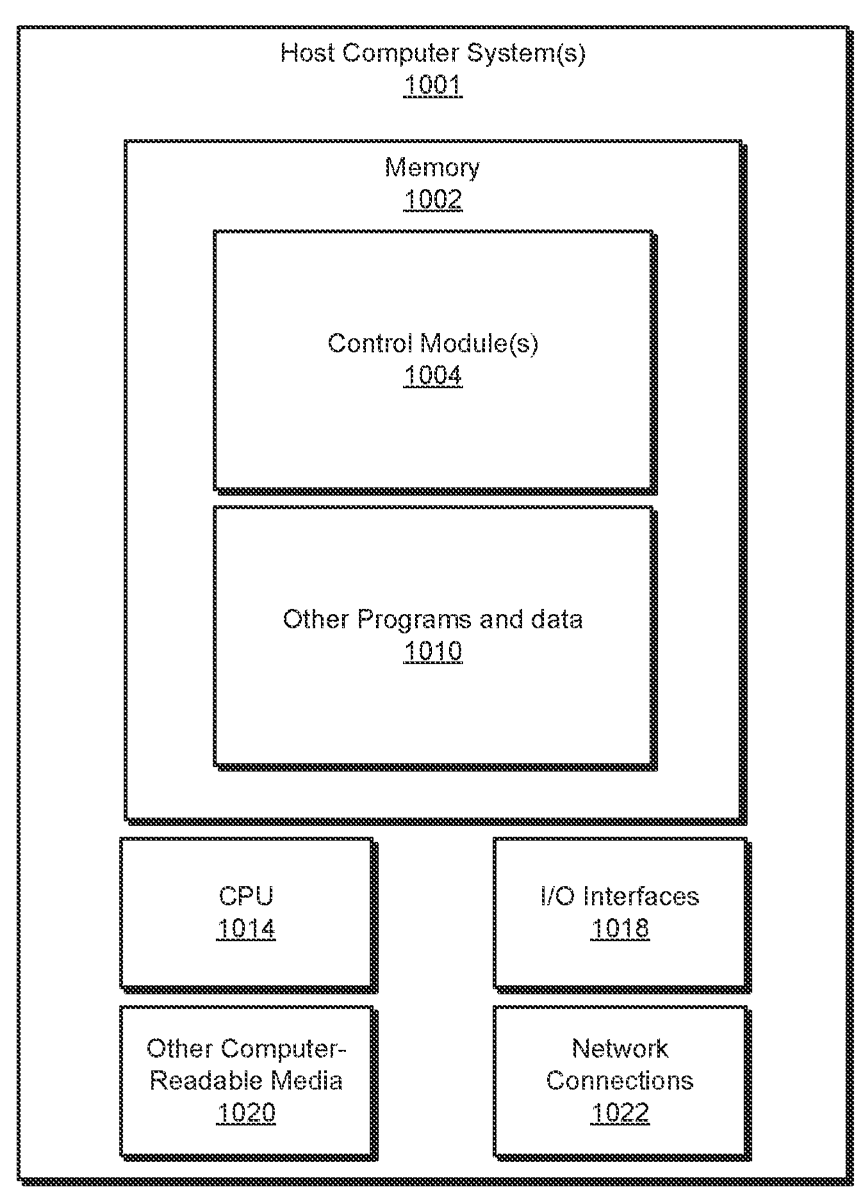
FIG. 10 shows a diagram of an example computing system that may facilitate the performance of one or more of the methods described herein.

FIG. 10 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 10 illustrates an example of underlying hardware on which such software and functionality may be hosted and/or implemented.

In particular, shown is example host computer system(s) 1001. For example, such computer system(s) 1001 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1001 may include memory 1002, one or more central processing units (CPUs) 1014, I/O interfaces 1018, other computer-readable media 1020, and network connections 1022.

Memory 1002 may include one or more various types of non-volatile and/or volatile storage technologies. Examples of memory 1002 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1002 may be utilized to store information, including computer-readable instructions that are utilized by CPU 1014 to perform actions, including those of embodiments described herein.

Memory 1002 may have stored thereon control module(s) 1004. The control module(s) 1004 may be configured to implement and/or perform some or all of the functions of the systems or components described herein. Memory 1002 may also store other programs and data 1010, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1022 are configured to communicate with other computing devices to facilitate the functionality described herein. In various embodiments, the network connections 1022 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1018 may include a video interface, other data input or output interfaces, or the like. Other computer-readable media 1020 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

tracking, by a mobile virtual network operator, for each respective case in a plurality of cases, progress through a series a nodes for respective performance stages along a production cycle for a product or service of the mobile virtual network operator, wherein each case involves a separate instance of the mobile virtual network operator providing the product or service to at least one client and each performance stage contributes to producing the product or service for the at least one client;

tracking, by the mobile virtual network operator, for each respective case in the plurality of cases, whether each respective case experienced a fallout at each node in the series of nodes such that a fallout rate is established for each respective node in the series of nodes;

categorizing, by the mobile virtual network operator, the fallout rate at each respective node into a respective performance category for the respective node; and providing, by the mobile virtual network operator, a graphical user interface that displays the series of nodes as a series of graphical nodes and that graphically indicates each respective performance category for each respective node based on the respective fallout rate of the respective node, wherein the graphical user interface displays the series of nodes as a series of graphical nodes at least in part by displaying a specific graphical node as an interactive element enabling a user to select and expand the specific graphical node into a subset of multiple graphical nodes corresponding to performance substages of the respective performance stage for the specific graphical node and wherein the graphical user interface displays the specific graphical node with a graphical indication of the specific graphical node as the interactive element enabling the user to select and expand the specific graphical node into the subset of multiple graphical nodes corresponding to performance substages of the respective performance stage for the specific graphical node.

2. The method of claim 1, further comprising tracking, for each respective node in the series of nodes along the production cycle for each respective case in the plurality of cases, whether the respective node experienced success, experienced failure, is currently executing, or is waiting to execute.

3. The method of claim 1, wherein the graphical user interface further provides a single order display that displays the series of graphical nodes and graphically indicates, for a specific case, whether the respective node experienced success, experienced failure, is currently executing, or is waiting to execute.

4. The method of claim 3, wherein the single order display graphically displays a data structure containing a plurality of fields describing the specific case.

5. The method of claim 4, wherein the plurality of fields designates at least a case identifier, a billing account identifier, a shipping account identifier, and a channel through which the specific case was received.

6. The method of claim 3, wherein the single order display graphically displays a selectable option for a user to perform at least one corrective action in response to a node in the series of nodes having experienced failure.

7. The method of claim 1, wherein the graphical user interface displays the specific graphical node in a form of overlapping rings indicating the specific graphical node as the interactive element enabling the user to select and expand the specific graphical node into the subset of multiple graphical nodes corresponding to performance substages of the respective performance stage for the specific graphical node.

8. The method of claim 1, wherein the series of nodes features a parallel track comprising a first track and a second track that can be performed at least partially overlapping in time.

9. The method of claim 1, wherein providing, by the mobile virtual network operator, the graphical user interface that displays the series of nodes as the series of graphical nodes and that graphically indicates each respective performance category for each respective node based on the respective fallout rate of the respective node comprises graphically indicating the respective performance category by drawing each graphical node in the series of graphical nodes with a modification that corresponds to the respective performance category.

10. The method of claim 9, wherein providing, by the mobile virtual network operator, the graphical user interface that displays the series of nodes as the series of graphical nodes and that graphically indicates each respective performance category for each respective node based on the respective fallout rate of the respective node further comprises graphically indicating the respective performance category by drawing each graphical node in the series of graphical nodes in a color that corresponds to the respective performance category.

11. The method of claim 10, wherein providing, by the mobile virtual network operator, the graphical user interface that displays the series of nodes as the series of graphical nodes and that graphically indicates each respective performance category for each respective node based on the respective fallout rate of the respective node further comprises graphically indicating the respective performance category by drawing each graphical node in the series of graphical nodes to include an icon or animation that corresponds to the respective performance category.

12. The method of claim 1, wherein providing, by the mobile virtual network operator, the graphical user interface that displays the series of nodes as the series of graphical nodes and that graphically indicates each respective performance category for each respective node based on the respective fallout rate of the respective node comprises displaying, within each respective node, an indicator of a direction of change in the fallout rate at the respective node.

13. The method of claim 12, wherein providing, by the mobile virtual network operator, the graphical user interface that displays the series of nodes as the series of graphical nodes and that graphically indicates each respective performance category for each respective node based on the respective fallout rate of the respective node further comprises displaying, within each respective node, a graphical arrow pointing in the direction of change in the fallout rate at the respective node.

14. The method of claim 12, wherein providing, by the mobile virtual network operator, the graphical user interface that displays the series of nodes as the series of graphical nodes and that graphically indicates each respective performance category for each respective node based on the respective fallout rate of the respective node further comprises displaying, within each respective node, the indicator of the direction of change in the fallout rate in a color that matches a color categorization in which the direction of change is categorized.

15. The method of claim 14, wherein providing, by the mobile virtual network operator, the graphical user interface that displays the series of nodes as the series of graphical nodes and that graphically indicates each respective performance category for each respective node based on the respective fallout rate of the respective node further comprises displaying a legend that indicates the color categorization in which the direction of change is categorized.

16. The method of claim 14, wherein providing, by the mobile virtual network operator, the graphical user interface that displays the series of nodes as the series of graphical nodes and that graphically indicates each respective performance category for each respective node based on the respective fallout rate of the respective node further comprises displaying a green indicator for a positive direction of change, a red indicator for a negative direction of change, or a yellow indicator for a neutral direction of change.

17. A system comprising:

at least one physical computing processor of a computing device; and a non-transitory computer-readable medium that has instructions stored thereon that, when executed by the at least one physical computing processor, cause the computing device to perform operations comprising:

tracking, by a mobile virtual network operator, for each respective case in a plurality of cases, progress through a series a nodes for respective performance stages along a production cycle for a product or service of the mobile virtual network operator, wherein each case involves a separate instance of the mobile virtual network operator providing the product or service to at least one client and each performance stage contributes to producing the product or service for the at least one client;

tracking, by the mobile virtual network operator, for each respective case in the plurality of cases, whether each respective case experienced a fallout at each node in the series of nodes such that a fallout rate is established for each respective node in the series of nodes;

categorizing, by the mobile virtual network operator, the fallout rate at each respective node into a respective performance category for the respective node; and providing, by the mobile virtual network operator, a graphical user interface that displays the series of nodes as a series of graphical nodes and that graphically indicates each respective performance category for each respective node based on the respective fallout rate of the respective node, wherein the graphical user interface displays the series of nodes as a series of graphical nodes at least in part by displaying a specific graphical node as an interactive element enabling a user to select and expand the specific graphical node into a subset of multiple graphical nodes corresponding to performance substages of the respective performance stage for the specific graphical node and wherein the graphical user interface displays the specific graphical node with a graphical indication of the specific graphical node as the interactive element enabling the user to select and expand the specific graphical node into the subset of multiple graphical nodes corresponding to performance substages of the respective performance stage for the specific graphical node.

18. A non-transitory computer-readable medium that has instructions stored thereon that, when executed by at least one physical computing processor, cause a computing device to perform operations comprising:

tracking, by a mobile virtual network operator, for each respective case in a plurality of cases, progress through a series a nodes for respective performance stages along a production cycle for a product or service of the mobile virtual network operator, wherein each case involves a separate instance of the mobile virtual network operator providing the product or service to at least one client and each performance stage contributes to producing the product or service for the at least one client;

tracking, by the mobile virtual network operator, for each respective case in the plurality of cases, whether each respective case experienced a fallout at each node in the series of nodes such that a fallout rate is established for each respective node in the series of nodes;

categorizing, by the mobile virtual network operator, the fallout rate at each respective node into a respective performance category for the respective node; and providing, by the mobile virtual network operator, a graphical user interface that displays the series of nodes as a series of graphical nodes and that graphically indicates each respective performance category for each respective node based on the respective fallout rate of the respective node, wherein the graphical user interface displays the series of nodes as a series of graphical nodes at least in part by displaying a specific graphical node as an interactive element enabling a user to select and expand the specific graphical node into a subset of multiple graphical nodes corresponding to performance substages of the respective performance stage for the specific graphical node and wherein the graphical user interface displays the specific graphical node with a graphical indication of the specific graphical node as the interactive element enabling the user to select and expand the specific graphical node into the subset of multiple graphical nodes corresponding to performance substages of the respective performance stage for the specific graphical node.

* * * * *